(12) United States Patent
Houghton et al.

(10) Patent No.: US 11,978,439 B2
(45) Date of Patent: May 7, 2024

(54) GENERATING TOPIC-SPECIFIC LANGUAGE MODELS

(71) Applicant: TiVo Corporation, San Jose, CA (US)

(72) Inventors: David F. Houghton, Brattleboro, VT (US); Seth Michael Murray, Redwood City, CA (US); Sibley Verbeck Simon, Santa Cruz, CA (US)

(73) Assignee: TiVo Corporation, San Jose, CA (US)

( * ) Notice: Subject to any disclaimer, the term of this patent is extended or adjusted under 35 U.S.C. 154(b) by 0 days.

(21) Appl. No.: 18/085,378

(22) Filed: Dec. 20, 2022

(65) Prior Publication Data

US 2023/0197069 A1   Jun. 22, 2023

Related U.S. Application Data

(63) Continuation of application No. 16/728,476, filed on Dec. 27, 2019, now Pat. No. 11,562,737, which is a continuation of application No. 15/843,846, filed on Dec. 15, 2017, now Pat. No. 10,559,301, which is a continuation of application No. 12/496,081, filed on Jul. 1, 2009, now Pat. No. 9,892,730.

(51) Int. Cl.
*G10L 15/183* (2013.01)
*G10L 15/197* (2013.01)

(52) U.S. Cl.
CPC .......... *G10L 15/183* (2013.01); *G10L 15/197* (2013.01)

(58) Field of Classification Search
CPC .................................................. G10L 15/183
See application file for complete search history.

(56) References Cited

U.S. PATENT DOCUMENTS

| 4,227,177 | A | 10/1980 | Moshier |
| 5,493,677 | A | 2/1996 | Balogh et al. |
| 5,521,841 | A | 5/1996 | Arman et al. |
| 5,530,859 | A | 6/1996 | Tobias et al. |
| 5,535,063 | A | 7/1996 | Amming |
| 5,553,281 | A | 9/1996 | Brown et al. |

(Continued)

FOREIGN PATENT DOCUMENTS

| CA | 2685833 A1 | 5/2010 |
| EP | 1241587 A1 | 9/2002 |

(Continued)

OTHER PUBLICATIONS

Arthur De Vany, W. David Walls, "Uncertainty in the Movie Industry: Does Star Power Reduce the Terror of the Box Office?," Journal of Cultural Economics, 1999, pp. 285-318, Issue 23, Kluwer Academic Publishers, Netherlands.

(Continued)

*Primary Examiner* — Shaun Roberts
(74) *Attorney, Agent, or Firm* — Haley Guiliano LLP

(57) ABSTRACT

Speech recognition may be improved by generating and using a topic specific language model. A topic specific language model may be created by performing an initial pass on an audio signal using a generic or basis language model. A speech recognition device may then determine topics relating to the audio signal based on the words identified in the initial pass and retrieve a corpus of text relating to those topics. Using the retrieved corpus of text, the speech recognition device may create a topic specific language model. In one example, the speech recognition device may adapt or otherwise modify the generic language model based on the retrieved corpus of text.

20 Claims, 7 Drawing Sheets

(56) References Cited

U.S. PATENT DOCUMENTS

| | | |
|---|---|---|
| 5,576,755 A | 11/1996 | Davis et al. |
| 5,594,897 A | 1/1997 | Goffman |
| 5,640,553 A | 6/1997 | Schultz |
| 5,649,182 A | 7/1997 | Reitz |
| 5,666,528 A | 9/1997 | Thai |
| 5,682,326 A | 10/1997 | Klingler et al. |
| 5,717,914 A | 2/1998 | Husick et al. |
| 5,729,741 A | 3/1998 | Liaguno et al. |
| 5,737,495 A | 4/1998 | Adams et al. |
| 5,737,734 A | 4/1998 | Schultz |
| 5,742,816 A | 4/1998 | Barr et al. |
| 5,761,655 A | 6/1998 | Hoffman |
| 5,765,150 A | 6/1998 | Burrows |
| 5,799,315 A | 8/1998 | Rainey et al. |
| 5,819,292 A | 10/1998 | Hitz et al. |
| 5,845,279 A | 12/1998 | Garofalakis et al. |
| 5,857,200 A | 1/1999 | Togawa |
| 5,924,090 A | 7/1999 | Krellenstein |
| 5,928,330 A | 7/1999 | Goetz et al. |
| 5,937,422 A | 8/1999 | Nelson et al. |
| 5,956,729 A | 9/1999 | Goetz et al. |
| 5,982,369 A | 11/1999 | Sciammarella et al. |
| 6,038,560 A | 3/2000 | Wical |
| 6,052,657 A | 4/2000 | Yamron et al. |
| 6,055,543 A | 4/2000 | Christensen et al. |
| 6,058,392 A | 5/2000 | Sampson et al. |
| 6,167,377 A | 12/2000 | Gillick et al. |
| 6,188,976 B1 | 2/2001 | Ramaswamy et al. |
| 6,278,992 B1 | 8/2001 | Curtis et al. |
| 6,320,588 B1 | 11/2001 | Palmer et al. |
| 6,343,294 B1 | 1/2002 | Hawley |
| 6,345,253 B1 | 2/2002 | Viswanathan |
| 6,363,380 B1 | 3/2002 | Dimitrova |
| 6,366,296 B1 | 4/2002 | Boreczky et al. |
| 6,374,260 B1 | 4/2002 | Hoffert et al. |
| 6,415,434 B1 | 7/2002 | Kind |
| 6,418,431 B1 | 7/2002 | Mahajan et al. |
| 6,463,444 B1 | 10/2002 | Jain et al. |
| 6,545,209 B1 | 4/2003 | Flannery et al. |
| 6,546,385 B1 | 4/2003 | Mao et al. |
| 6,567,980 B1 | 5/2003 | Jain et al. |
| 6,580,437 B1 | 6/2003 | Liou et al. |
| 6,675,174 B1 | 1/2004 | Bolle et al. |
| 6,698,020 B1 | 2/2004 | Zigmond et al. |
| 6,771,875 B1 | 8/2004 | Kunieda et al. |
| 6,789,088 B1 | 9/2004 | Lee et al. |
| 6,792,426 B2 | 9/2004 | Baumeister et al. |
| 6,877,134 B1 | 4/2005 | Fuller et al. |
| 6,882,793 B1 | 4/2005 | Fu et al. |
| 6,901,364 B2 | 5/2005 | Nguyen et al. |
| 6,937,766 B1 | 8/2005 | Wilf et al. |
| 6,970,639 B1 | 11/2005 | McGrath et al. |
| 7,016,830 B2 | 3/2006 | Huang et al. |
| 7,155,392 B2 | 12/2006 | Schmid et al. |
| 7,177,861 B2 | 2/2007 | Tovinkere et al. |
| 7,206,303 B2 | 4/2007 | Karas et al. |
| 7,272,558 B1 | 9/2007 | Soucy et al. |
| 7,376,642 B2 | 5/2008 | Nayak et al. |
| 7,472,137 B2 | 12/2008 | Edelstein et al. |
| 7,490,092 B2 | 2/2009 | Sibley et al. |
| 7,548,934 B1 | 6/2009 | Platt et al. |
| 7,584,102 B2 | 9/2009 | Hwang et al. |
| 7,596,549 B1 | 9/2009 | Issa et al. |
| 7,739,286 B2 | 6/2010 | Sethy et al. |
| 7,788,266 B2 | 8/2010 | Venkataraman et al. |
| 7,792,812 B1 | 9/2010 | Carr |
| 7,814,267 B1 | 10/2010 | Iyengar et al. |
| 7,921,116 B2 | 4/2011 | Finkelstein et al. |
| 7,925,506 B2 | 4/2011 | Farmaner et al. |
| 7,958,119 B2 | 6/2011 | Eggink et al. |
| 7,983,902 B2 | 7/2011 | Wu et al. |
| 8,041,566 B2 | 10/2011 | Peters et al. |
| 8,078,467 B2 | 12/2011 | Wu et al. |
| 8,117,206 B2 | 2/2012 | Sibley et al. |
| 8,265,933 B2 | 9/2012 | Bates et al. |
| 8,468,083 B1 | 6/2013 | Szulczewski |
| 8,527,520 B2 | 9/2013 | Morton et al. |
| 8,572,087 B1 | 10/2013 | Yagnik |
| 8,909,655 B1 | 12/2014 | McDonnell |
| 10,073,829 B2 | 9/2018 | Medlock et al. |
| 2001/0014891 A1 | 8/2001 | Hoffert et al. |
| 2002/0035573 A1 | 3/2002 | Black et al. |
| 2002/0087315 A1 | 7/2002 | Lee et al. |
| 2002/0091837 A1 | 7/2002 | Baumeister et al. |
| 2002/0143774 A1 | 10/2002 | VanderSluis |
| 2002/0194181 A1 | 12/2002 | Wachtel |
| 2003/0014758 A1 | 1/2003 | Kim |
| 2003/0033297 A1 | 2/2003 | Ogawa |
| 2003/0050778 A1 | 3/2003 | Nguyen et al. |
| 2003/0061028 A1 | 3/2003 | Dey et al. |
| 2003/0093790 A1 | 5/2003 | Logan et al. |
| 2003/0135582 A1 | 7/2003 | Allen et al. |
| 2003/0163443 A1 | 8/2003 | Wang |
| 2003/0163815 A1 | 8/2003 | Begeja et al. |
| 2003/0195877 A1 | 10/2003 | Ford et al. |
| 2003/0204513 A1 | 10/2003 | Bumbulis |
| 2004/0111465 A1 | 6/2004 | Chuang et al. |
| 2004/0117831 A1 | 6/2004 | Ellis et al. |
| 2004/0139091 A1 | 7/2004 | Shin |
| 2004/0215634 A1 | 10/2004 | Wakefield et al. |
| 2004/0225667 A1 | 11/2004 | Hu et al. |
| 2004/0243539 A1 | 12/2004 | Skurtovich et al. |
| 2004/0254795 A1 | 12/2004 | Fujii et al. |
| 2004/0267700 A1 | 12/2004 | Dumais et al. |
| 2005/0044105 A1 | 2/2005 | Terrell |
| 2005/0060647 A1 | 3/2005 | Doan et al. |
| 2005/0091443 A1 | 4/2005 | Hershkovich et al. |
| 2005/0097138 A1 | 5/2005 | Kaiser et al. |
| 2005/0114130 A1 | 5/2005 | Java et al. |
| 2005/0152362 A1 | 7/2005 | Wu |
| 2005/0182792 A1 | 8/2005 | Israel et al. |
| 2005/0193005 A1 | 9/2005 | Gates et al. |
| 2005/0222975 A1 | 10/2005 | Nayak et al. |
| 2006/0004738 A1 | 1/2006 | Blackwell et al. |
| 2006/0037046 A1 | 2/2006 | Simms et al. |
| 2006/0074671 A1 | 4/2006 | Farmaner et al. |
| 2006/0085406 A1 | 4/2006 | Evans et al. |
| 2006/0088276 A1 | 4/2006 | Cho et al. |
| 2006/0100898 A1 | 5/2006 | Pearce et al. |
| 2006/0112097 A1 | 5/2006 | Callaghan et al. |
| 2006/0156399 A1 | 7/2006 | Parmar et al. |
| 2006/0161546 A1 | 7/2006 | Callaghan et al. |
| 2006/0167859 A1 | 7/2006 | Verbeck et al. |
| 2006/0184495 A1 | 8/2006 | Crosby et al. |
| 2006/0212288 A1 | 9/2006 | Sethy et al. |
| 2006/0235843 A1 | 10/2006 | Musgrove et al. |
| 2006/0253780 A1 | 11/2006 | Munetsugu et al. |
| 2006/0256739 A1 | 11/2006 | Seier et al. |
| 2007/0011133 A1 | 1/2007 | Chang |
| 2007/0050343 A1 | 3/2007 | Siddarammappa et al. |
| 2007/0050366 A1 | 3/2007 | Bugir et al. |
| 2007/0067285 A1 | 3/2007 | Blume et al. |
| 2007/0078708 A1 | 4/2007 | Yu et al. |
| 2007/0083374 A1 | 4/2007 | Bates et al. |
| 2007/0156677 A1 | 7/2007 | Szabo |
| 2007/0208567 A1 | 9/2007 | Amento et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0233487 A1 | 10/2007 | Cohen et al. |
| 2007/0233656 A1 | 10/2007 | Bunescu et al. |
| 2007/0233671 A1 | 10/2007 | Klein et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0271086 A1 | 11/2007 | Peters et al. |
| 2008/0033915 A1 | 2/2008 | Chen et al. |
| 2008/0046929 A1 | 2/2008 | Cho et al. |
| 2008/0059418 A1 | 3/2008 | Barsness et al. |
| 2008/0091633 A1 | 4/2008 | Rappaport et al. |
| 2008/0118153 A1 | 5/2008 | Wu et al. |
| 2008/0133504 A1 | 6/2008 | Messer et al. |
| 2008/0162533 A1 | 7/2008 | Mount et al. |
| 2008/0163328 A1 | 7/2008 | Philbin et al. |

(56) References Cited

U.S. PATENT DOCUMENTS

| | | |
|---|---|---|
| 2008/0168045 A1 | 7/2008 | Suponau et al. |
| 2008/0183681 A1 | 7/2008 | Messer et al. |
| 2008/0183698 A1 | 7/2008 | Messer et al. |
| 2008/0189110 A1 | 8/2008 | Freeman et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0208864 A1 | 8/2008 | Cucerzan et al. |
| 2008/0221989 A1 | 9/2008 | Messer et al. |
| 2008/0222105 A1 | 9/2008 | Matheny |
| 2008/0222106 A1 | 9/2008 | Rao et al. |
| 2008/0222142 A1 | 9/2008 | ODonnell |
| 2008/0235209 A1 | 9/2008 | Rathod et al. |
| 2008/0235393 A1 | 9/2008 | Kunjithapatham et al. |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0281801 A1 | 11/2008 | Larson et al. |
| 2008/0288641 A1 | 11/2008 | Messer et al. |
| 2008/0319962 A1 | 12/2008 | Riezler et al. |
| 2009/0006315 A1 | 1/2009 | Mukherjea et al. |
| 2009/0006391 A1 | 1/2009 | Ram |
| 2009/0013002 A1 | 1/2009 | Eggink et al. |
| 2009/0025054 A1 | 1/2009 | Gibbs et al. |
| 2009/0055381 A1 | 2/2009 | Wu et al. |
| 2009/0077078 A1 | 3/2009 | Uppala et al. |
| 2009/0083257 A1 | 3/2009 | Bargeron et al. |
| 2009/0094113 A1 | 4/2009 | Berry et al. |
| 2009/0123021 A1 | 5/2009 | Jung et al. |
| 2009/0131028 A1 | 5/2009 | Horodezky et al. |
| 2009/0144260 A1 | 6/2009 | Bennett et al. |
| 2009/0144609 A1 | 6/2009 | Liang et al. |
| 2009/0157680 A1 | 6/2009 | Crossley et al. |
| 2009/0172544 A1 | 7/2009 | Tsui et al. |
| 2009/0198686 A1 | 8/2009 | Cushman et al. |
| 2009/0204599 A1 | 8/2009 | Morris et al. |
| 2009/0205018 A1 | 8/2009 | Ferraiolo et al. |
| 2009/0240650 A1 | 9/2009 | Tyler et al. |
| 2009/0240674 A1 | 9/2009 | Wilde et al. |
| 2009/0271195 A1 | 10/2009 | Kitade et al. |
| 2009/0279682 A1 | 11/2009 | Strandell et al. |
| 2009/0282069 A1 | 11/2009 | Callaghan et al. |
| 2009/0326947 A1 | 12/2009 | Arnold et al. |
| 2010/0042602 A1 | 2/2010 | Smyros et al. |
| 2010/0063886 A1 | 3/2010 | Stratton et al. |
| 2010/0070507 A1 | 3/2010 | Mori |
| 2010/0094845 A1 | 4/2010 | Moon et al. |
| 2010/0138653 A1 | 6/2010 | Spencer et al. |
| 2010/0250598 A1 | 9/2010 | Brauer et al. |
| 2011/0004462 A1 | 1/2011 | Houghton et al. |
| 2011/0016106 A1 | 1/2011 | Xia |
| 2011/0077943 A1 | 3/2011 | Miki et al. |
| 2011/0125728 A1 | 5/2011 | Smyros et al. |
| 2011/0191099 A1 | 8/2011 | Farmaner et al. |
| 2011/0246503 A1 | 10/2011 | Bender et al. |
| 2012/0036119 A1 | 2/2012 | Zwicky et al. |
| 2012/0078932 A1 | 3/2012 | Skurtovich et al. |
| 2012/0150636 A1 | 6/2012 | Freeman et al. |
| 2012/0191695 A1 | 7/2012 | Xia |
| 2012/0203708 A1 | 8/2012 | Psota et al. |
| 2013/0054589 A1 | 2/2013 | Cheslow |
| 2013/0216207 A1 | 8/2013 | Berry et al. |

FOREIGN PATENT DOCUMENTS

| | | |
|---|---|---|
| EP | 1462950 A1 | 9/2004 |
| EP | 1501305 A1 | 1/2005 |
| GB | 2448874 A | 11/2008 |
| GB | 2448875 A | 11/2008 |
| WO | 9950830 A1 | 10/1999 |
| WO | 0205135 A2 | 1/2002 |
| WO | 2005050621 A2 | 6/2005 |
| WO | 2006099621 A2 | 9/2006 |
| WO | 2007115224 A2 | 10/2007 |
| WO | 2008053132 A1 | 5/2008 |
| WO | 2009052277 A1 | 4/2009 |
| WO | 2010100853 A1 | 9/2010 |

OTHER PUBLICATIONS

Behrang Mohit and Rebecca Hwa, 2005. Syntax-based Semi-Supervised Named Entity Tagging. In Proceedings of the ACL Interactive Poster and Demonstration Sessions, pp. 57-60.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 306-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Eberman, et al., "Indexing Multimedia for the Internet", Compaq, Cambridge Research laboratory, Mar. 1999, pp. 1-8 and Abstract.

ESR—EP10154725.5—dated Nov. 2, 2010.

ESR—EP10155340.2—dated Nov. 25, 2010.

ESR—EP10162666.1—dated Aug. 4, 2011.

ESR—EP10167947.0—dated Sep. 28, 2010.

European Search Report EP 09180762, dated Mar. 22, 2010.

European Search Report EP09179987.4, dated Jun. 4, 2010.

European Search Report for Application No. 09180776.8, dated Jun. 7, 2010, 9 pages.

European Search Report for application No. 10167947.0, dated Sep. 28, 2010.

Experiments in Spoken Document Retrieval at CMU, M.A. Siegler, et al., School of Computer Science Carnegie Mellon University, Pittsburgh, PA 15213-3890, Justsystem Pittsburgh Research Center, 4616 Henry Street, Pittsburgh, PA 15213.

Extended European Search Report—EP 09815446.1—dated May 7, 2013.

Hsin-Min Wang and Berlin Chen, "Content-based Language Models for Spoken Document Retrieval", ACM, 2000, pp. 149-155.

International Preliminary Examination Report for PCT/US01/20894, dated Feb. 4, 2002.

Ishitani, et al., "Logical Structure Analysis of Document Images Based on Emergent Computation", IEEE Publication, pp. 189-192, Jul. 1999.

ISR PCT/US2001/020894—dated Nov. 25, 2003.

Kalina Bontcheva et al "Shallow Methods for Named Entity Coreference Resolution", Proc. of Tah 2002, Jan. 1, 2002.

Kontothoanassis, Ledonias et al. "Design, Implementation, and Analysis of a Multimedia Indexing and Delivery Server", Technical Report Series, Aug. 1999, Cambridge Research Laboratory.

Koskela M. et al., "Measuring Concept Similarities in Multimedia Ontologies: Analysis and Evaluations", IEEE Transactions on Multimedia, vol. 9, No. 5, pp. 912-922, Aug. 2007.

Li et al., "Reliable Video Clock Time Recognition," Pattern Recognition, 2006, 1CPR 1006, 18th International Conference on Pattern Recognition, 4 pages.

Liang Bai et al., "Video Semantic Content Analysis based on Ontology", International Machine Vision and Image recessing Conference, pp. 117-124, Sep. 2007.

Marin Feldman, Ostendorf and Gupta, "Filtering Web Text to Match Target Genres", International Conference on Acoustics, Speech and Signal Processing, 2009, Piscataway, NJ, Apr. 19, 2009, pp. 3705-3708.

Martin Jansche, 2002. Named EntityEntityExtraction with Conditional Markov Models and Classifiers. In Proceedings of ThNLL-2002.

Messer, Alan et al., "SeeNSearch: A context Directed Search Facilitator for Home Entertainment Devices", Japer, Samsung Information Systems America Inc., San Jose, CA, Sep. 17, 2008.

Partial ESR—EP10155340.2—dated Jul. 12, 2010.

PRP PCT/US2009/069644—dated Jun. 29, 2011.

R. Bunescu and M. Pasca. 2006. Using encyclopedic knowledge for named entity disambiguation. In Proceedings of EACL-2006, pp. 9-16.

(56) References Cited

OTHER PUBLICATIONS

Radu Florian, 2002. Named entity recognition as a house of cards: Classifier stacking. In Proceedings of CoNL2002, pp. 175-178.
Raphael Volz et al., "Towards ontology-based disambiguation of geographical identifiers", Proceedings of the JVWVV2007 Workship 13: Identity, Identifiers, Identification, Entity-Centric Approaches to Information and Knowledge Management on the Web, 2007.
S. Cucerzan. 2007. Large-Scale Named Entity Disambiguation Based on Wikipedia Data. In Proceedings of EMNLP-CONLL44,2007, pp. 708-716.
Salton et al., Computer Evaluation of Indexing and Text Processing Journal of the Association for 3omputing Machinery, vol. 15, No. 1, Jan. 1968, pp. 8-36.
Sethy, Abhinav, Panayiotis G. Georgiou, and Shrikanth Narayanan. "Building topic specific language models from webdata using competitive models." InterSpeech. 2005.
Shahraray: "Impact and Applications of Video Content Analysis and Coding in the internet and Telecommunications", pkT&T Labs Research, A Position Statement for Panel 4: Applications the 1998 International Workshop on Very Low Bitrate Video Coding, 3 pages.
Shumeet Baluja, Vibhu Mittal and Rahul Sukthankar, 1999. Applying machine learning for high performance named-3ntity extraction. In Proceedings of Pacific Association for Computational Linguistics.
Smith, J.R. et al., "An Image and Video Search Engine for the World-Wide Web" Storage and Retrieval for Image and Video Databases 5, San Jose, Feb. 13-14, 1997, Proceedings of Spie, Belingham, Spie, US, vol. 3022, Feb. 13, 1997, pp. 84-95.
SR PCT/US2009/069644—dated Mar. 4, 2010.
Steffen Staab et al., "Semantic Multimedia", Reasoning Web; Lecture Notes in Computer Science, pp. 125-170, Sep. 2008.
Thamar Solorio, 2004. Improvement of Named Entity Tagging by Machine Learning. Reporte Tecnico No. MC-04-004. INAOE.
Then, "Extraction of Indicative Summary Sentences from Imaged Documents", IEEE publication, 1997, pp. 227-232.
Then, Langzhou, et al. "Using information retrieval methods for language model adaptation." InterSpeech. 2001.
Towards a Multimedia World-Wide Web Information retrieval engines, Sougata Mukherjea, Kyoji Hirata, and Yoshinori Flara Computer Networks and ISDN Systems 29 (1997) 1181-1191.
Wacholder N et al., "Disambiguation of Proper Names in Text", Proceedings of the Conference on Applied Natural Language Processing, Association Computer Linguistics, Morrisontown, NJ, Mar. 1, 2007.
Zhang et al. 2004. Using the web for automated translation extraction in cross-language information retrieval, Proceedings of the 27th annual intl ACM SIGIR conference on Research and development in info retrieval (SIGIR '04). ACM, NY, NY, USA, 162-169.

Actor X makes his big screen debut in a sci-fi adventure, ALIENS COMES TO EARTH. X plays Jack Doe, a surly former felon who is trying to stay out of trouble by driving a truck in Seattle and who embarks upon the adventure of a lifetime when two teens appear in his taxi and need a ride to their spaceship. Doe quickly realizes that the mysterious siblings are far from average -- especially when they reveal they are aliens from a distant planet. With the help of Dr. ZZZ, the trio travels to a secret launch pad in the Nevada desert, with the hopes of evading their pursuers and sending the two teens home and saving Earth in the process. This movie has the potential to draw crowds of all ages.

| TOPIC WORD/ PHRASE | KEYWORDS |
|---|---|
| FOOD 501a | MEAL, LUNCH, DINNER, HOT DOGS, PIZZA 503a |
| SPORTS 501b | ATHLETIC ACTIVITY, COMPETITION, FOOTBALL, HOCKEY 503b |
| FOOTBALL | FIELD GOAL, TOUCHDOWN, QUARTERBACK, NFL |
| PHOTOGRAPHY | CAMERA, LENS, PHOTO, FILM |

FIG. 5

GENERATING TOPIC-SPECIFIC LANGUAGE MODELS

CROSS-REFERENCES TO RELATED APPLICATIONS

This application is a continuation of U.S. patent application Ser. No. 16/728,476, filed Dec. 27, 2019, which is a continuation of U.S. patent application Ser. No. 15/843,846, filed Dec. 15, 2017, now U.S. Pat. No. 10,559,301, which is a continuation of U.S. patent application Ser. No. 12/496,081, filed Jul. 1, 2009, now U.S. Pat. No. 9,892,730, the contents of which are hereby incorporated by reference in their entireties.

BACKGROUND

Automated speech recognition uses a language model to identify the most likely candidate matching a word or expression used in a natural language context. In many instances, the language model used is built using a generic corpus of text and might not offer the most accurate or optimal representation of natural language for a given topic. For example, in a scientific context, the word "star" may be less likely to follow the phrase "country music" than in an entertainment context. Accordingly, when evaluating an audio signal relating to science, a speech recognition system may achieve more accurate results using a language model specific to the topic of science, rather than a generic language model.

BRIEF SUMMARY

The following presents a simplified summary of the disclosure in order to provide a basic understanding of some aspects. It is not intended to identify key or critical elements or to delineate the scope. The following summary merely presents some concepts of the disclosure in a simplified form as a prelude to the more detailed description provided below.

According to one or more aspects, a speech recognition system may automatically generate a topic specific language model and recognize words in a speech signal using the generated model. For example, a speech recognition system may initially determine words in a audio speech signal using a basic or generic language model. A language model, as used herein, generally refers to a construct that defines probabilities of words appearing after another word or set of words (or within a predefined proximity of another word). The speech recognition system may use the determined words to identify one or more topics associated with the speech signal and use the identified topics to obtain a corpus of text relating to those topics. The corpus of text allows the speech recognition system to create a topic specific language model by, in one example, modifying or adapting the basic or generic language model according to the probabilities and language structure presented in the topic specific corpus of text. A second speech recognition pass may then be performed using the topic specific language model to enhance the accuracy of speech recognition. In one or more arrangements, the topic specific language model may be generated on-the-fly, thereby eliminating the need to pre-generate language models prior to receiving or beginning processing of an audio signal.

According to another aspect, collecting a corpus of topic specific text may include generating one or more search queries and using those search queries to identify articles, publications, websites and other documents and files. In one example, the search queries may be entered into a search engine such as GOOGLE or PUBMED. Text may then be extracted from each of the results returned from the search. In one or more arrangements, a corpus collection module may further clean the text by removing extraneous or irrelevant data such as bylines, advertisements, images, formatting codes and information and the like. The corpus collection module may continue to collect text until a specified threshold has been reached.

According to another aspect, multiple queries may be generated for corpus collection. For example, a speech recognition system or text collection module may generate multiple queries for a single topic to increase the amount of text returned. Alternatively or additionally, an audio signal may include multiple topics. Accordingly, at least one query may be generated for each of the multiple topics to insure that the corpus of text collected is representative of the audio signal.

According to yet another aspect, the corpus of text collected may be representative of a distribution of topics associated with the speech signal. Stated differently, a speech signal may include a variety of topics, each topic having a degree of emphasis or significance in that speech signal. The corpus of text may include amounts of text that have been collected based on that distribution of topic significance or emphasis. In one example, the number of words or phrases associated with a topic may be used as a measure of its significance in a speech signal. A threshold number of words may then be divided according to the significance.

The details of these and other embodiments are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 3 illustrates an example segment of an audio signal that may be processed using a speech recognition system according to one or more aspects described herein.

FIG. 5 illustrates an example keyword table according to one or more aspects described herein.

DETAILED DESCRIPTION

Figure 1:
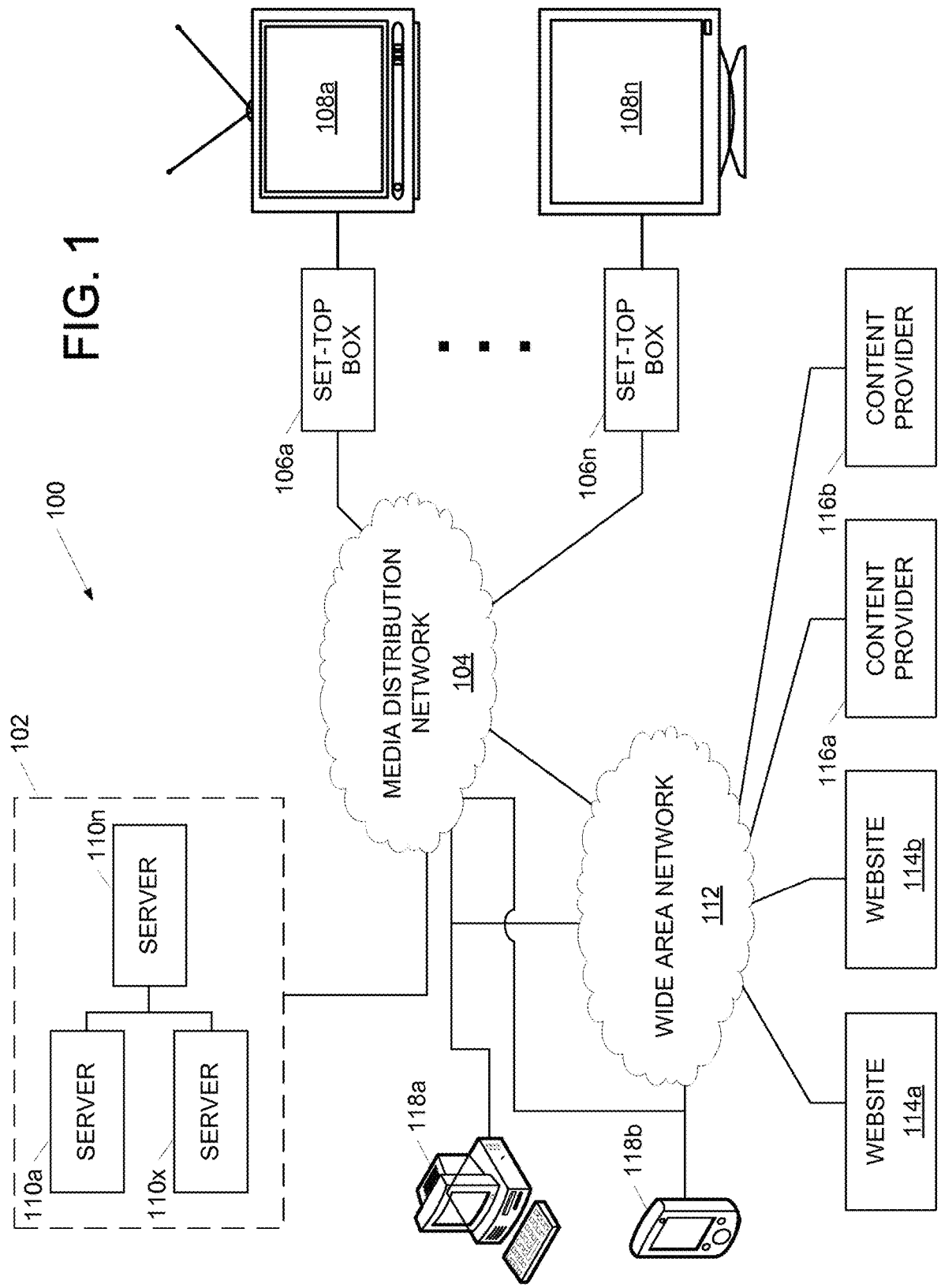
FIG. 1 illustrates an example network distribution system in which content items may be provided to subscribing clients.

FIG. 1 illustrates a content processing and distribution system 100 that may be used in connection with one or more aspects described herein. The distribution system 100 may include a headend 102, a network 104, set top boxes (STB) 106 and corresponding receiving devices (e.g., receiver, transceiver, etc.) 108. The distribution system 100 may be used as a media service provider/subscriber system wherein the provider (or vendor) generally operates the headend 102 and the network 104 and also provides a subscriber (e.g., client, customer, service purchaser, user, etc.) with the STB 106.

The STB 106 is generally located at the subscriber location such as a subscriber's home, a tavern, a hotel room, a business, etc., and the receiving device 108 is generally provided by the subscribing client. The receiving device 108 may include a television, high definition television (HDTV), monitor, host viewing device, MP3 player, audio receiver, radio, communication device, personal computer, media player, digital video recorder, game playing device, etc. The device 108 may be implemented as a transceiver having interactive capability in connection with the STB 106, the headend 102 or both the STB 106 and the headend 102. Alternatively, STB 106 may include a cable modem for computers for access over cable.

The headend 102 is generally electrically coupled to the network 104, the network 104 is generally electrically coupled to the STB 106, and each STB 106 is generally electrically coupled to the respective device 108. The electrical coupling may be implemented as any appropriate hard-wired (e.g., twisted pair, untwisted conductors, coaxial cable, fiber optic cable, hybrid fiber cable, etc.) or wireless (e.g., radio frequency, microwave, infrared, etc.) coupling and protocol (e.g., Home Plug, HomePNA, IEEE 802.11(a-b), Bluetooth, HomeRF, etc.) to meet the design criteria of a particular application. While the distribution system 100 is illustrated showing one STB 106 coupled to one respective receiving device 108, each STB 106 may be configured with having the capability of coupling more than one device 108.

The headend 102 may include a plurality of devices 110 (e.g., devices 110a-110n) such as data servers, computers, processors, security encryption and decryption apparatuses or systems, and the like configured to provide video and audio data (e.g., movies, music, television programming, games, and the like), processing equipment (e.g., provider operated subscriber account processing servers), television service transceivers (e.g., transceivers for standard broadcast television and radio, digital television, HDTV, audio, MP3, text messaging, gaming, etc.), and the like. At least one of the devices 110 (e.g., a sender security device 110x), may include a security system.

In one or more embodiments, network 104 may further provide access to a wide area network (WAN) 112 such as the Internet. Accordingly, STB 106 or headend 102 may have access to content and data on the wide area network. Content items may include audio, video, text and/or combinations thereof. In one example, a service provider may allow a subscriber to access websites 114 and content providers 116 connected to the Internet (e.g., WAN 112) using the STB 106. Websites 114 may include news sites, social networking sites, personal webpages and the like. In another example, a service provider (e.g., a media provider) may supplement or customize media data sent to a subscriber's STB 106 using data from the WAN 112. Alternatively or additionally, one or more other computing devices 118 may be used to access either media distribution network 104 or wide area network 112.

Using networks such as those illustrated and described with respect to FIG. 1, a speech recognition device and/or system may access a corpus of information that relates to a specific topic or set of topics to refine and build a topic specific language model. The topic specific language model may be better honed to identify the spoken words used in natural language associated with the identified topic or topics. In one or more examples, a speech recognition device may search for articles and other textual material relating to a topic from various content sources such as content providers 116 and websites 114 of FIG. 1. The speech recognition device may then generate a language model based thereon, as described in further detail herein.

Figure 2:
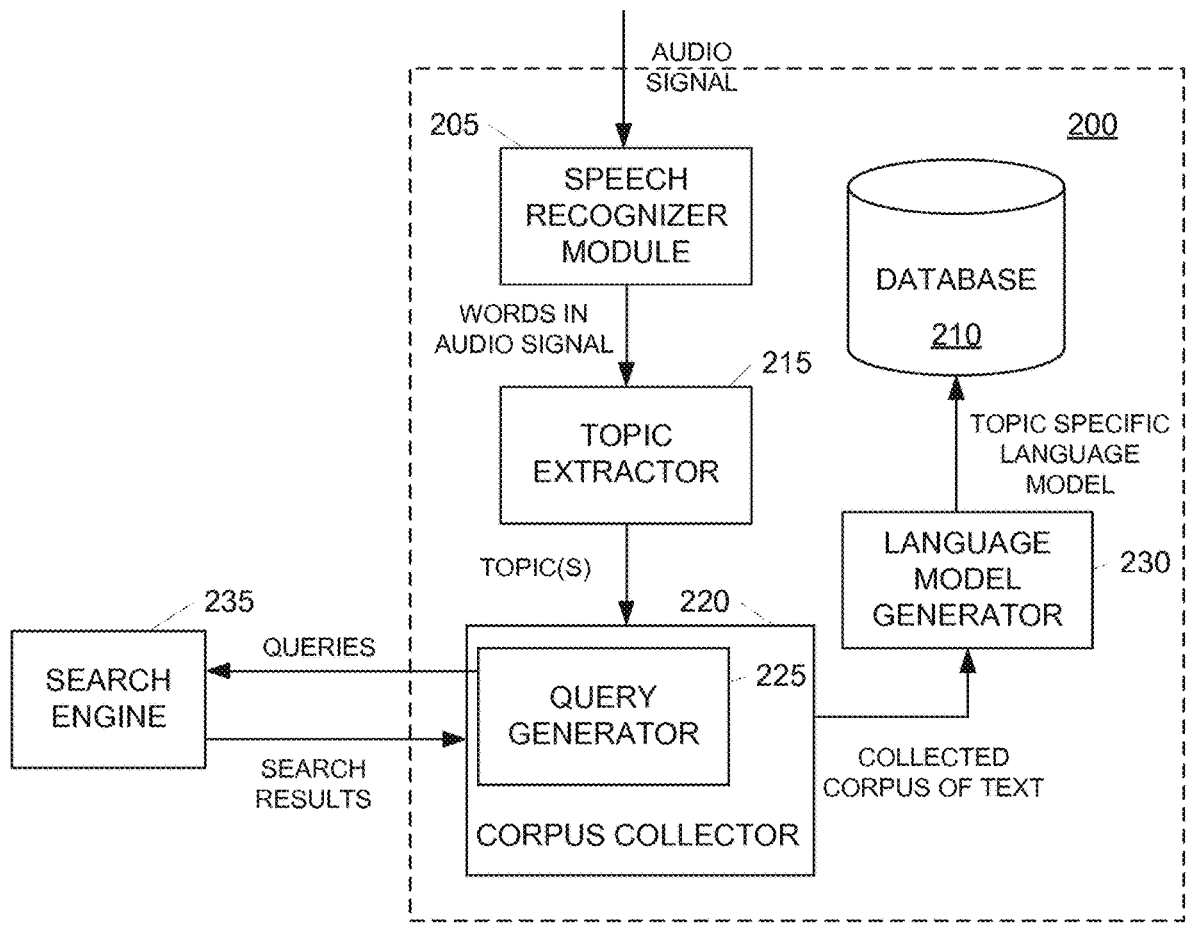
FIG. 2 illustrates an example speech recognition system configured to identify words in an audio signal based on a topic specific language model according to one or more aspects described herein.

FIG. 2 illustrates an example speech recognition device configured to generate a language model based on a particular topic. Initially, natural language data such as audio is received by speech recognizer module 205 of speech recognition device 200 to identify an initial set of words contained in the audio based on a generic language model stored in database 210. A generic language model may be created using a generic corpus of text and might not be specific to any particular topic. Speech recognizer module 205 may include software, hardware, firmware and/or combinations thereof such as SCANSOFT's DRAGON NATURALLY SPEAKING speech recognition software.

From the initial set of identified words, topic extractor 215 is configured to identify one or more topics associated with the natural language data. Topics may be identified from the initial set of words in a variety of ways including by determining a frequency of words used, identification of meaningful vs. non-meaningful words, determining a type of word (e.g., noun, verb, etc.) and/or combinations thereof. For example, words that are used most frequently might be treated as being indicative of a topic of the audio. In another example, meaningful words might be predefined and identified in the natural language data. Accordingly, topic extractor 215 may eliminate non-meaningful words such as "the" or "of" from topic consideration even if such words appear relatively frequently. In one example, stop word lists or noise word lists may be used to filter out non-meaningful words. Stop word lists and other types of word filtering lists may be topic-specific or may be universal for all topics.

In some arrangements, speech recognizer module 205 might not perform a first pass on the natural language to identify the initial set of words. Instead, topic extractor 215 may be configured to identify topics associated with the natural language based on other information such as metadata. For example, if speech recognition device 200 is processing audio stored in an audio file, topic extractor 215 may extract topics from metadata included in the audio file such as a genre, artist, subject and title. If the audio file is located on a webpage, topic extractor 215 may use page or site data extracted from the webpage for topic determination. Alternatively or additionally, a combination of metadata and the initial set of recognized words may be used to identify topics to which the audio relates. A topic may include any number of words and in some instances, may include phrases.

Once topic extractor 215 has outputted the topic(s) of the natural language data, a query generator 225 of a corpus collector module 220 is configured to create search queries for obtaining a corpus of text relating to the identified topics. In one example, the query generator 225 may create search queries for a search engine 235 such as GOOGLE. In another example, query generator 225 may formulate queries for identifying publications in a database such as PUBMED. Queries may be formed using the identified topic words or phrases in a keyword search. Alternatively or additionally, speech recognition device 200 may maintain a definition or meaning table in database 210 to provide further keywords that may be used in a search query. For example, the word "rocket" may be associated with additional key words and phrases "weapon," "propulsion," "space shuttle" and the like. Accordingly, multiple search query strings may be formed using various combinations of the topic words and associated keywords.

Articles and other text identified through the search query may then be fed from corpus collector module 220 into a language model generator 230 that creates a language model specific to the topic or topics identified by topic extractor 215. Language models, as used herein, generally refer to data constructs configured to represent a probability of a sequence of words appearing together. Various types of language models may include n-gram language models which specify the probability of a set of n words appearing together (sometimes in a certain sequence). In one example, a language model may indicate that the probability of the word "friend" appearing immediately after the word "best" is more likely than "friend" appearing immediately after the word "chest" in a n-gram language model, where n=2. Accordingly, a speech recognition device such as device 200 may be able to ascertain whether an utterance (e.g., a spoken word or sound in an audio signal) corresponds to the word "chest" or "best" based on the following word (e.g., "friend"). Thus, a language model allows a device or a user to determine the odds that a speech signal includes word or phase x.

To create the topic specific language model, language model generator 230 may modify a basic language model in accordance with the probabilities determined from the text collected by corpus collector 220 (as discussed in further detail herein). Thus, probabilities of certain word combinations or n-grams may be modified based on their frequency of occurrence in the collected corpus of text. Using this topic specific language model, speech recognition device 200 may perform a second pass on the natural language to identify the words used in the speech.

Figure 4:
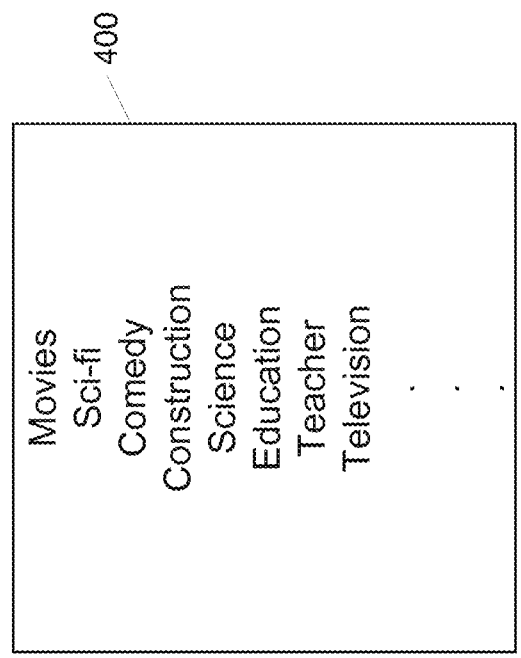
FIG. 4 illustrates an example listing of meaningful words according to one or more aspects described herein.

FIG. 3 illustrates an example segment of an audio speech signal from which one or more topics may be extracted. Segment 300 may represent a speech signal from a television show or some other audio clip, for instance. From segment 300, topics such as movies, Actor X and sci-fi may be extracted based on frequency of words associated with those topics, definition of meaningful vs. non-meaningful words and the like. FIG. 4, for example, illustrates a list 400 of predefined meaningful words that may be evaluated in determining a topic of speech. Accordingly, because "movie" appears in segment 300, a speech recognition device (e.g., device 200 of FIG. 2) may evaluate whether movies is a topic of segment 300. Words or phrases not in list 400 might be discarded from topic consideration.

Frequency, on the other hand, corresponds to the number of times a word or topic appears in a segment of speech. In some instances, a topic may correspond to multiple words. Accordingly, even though segment 300 includes only 1 mention of the word "movie," a frequency assigned to the topic of movies may have a value of 2 in view of the use of the phrase "big screen," a known colloquialism for movies. In one or more configurations, a word or phrase may be extracted as a topic if the determined frequency is above a certain threshold. The threshold may be defined manually, automatically or a combination thereof. In one example, topics may be identified from the three words or phrases used most frequently in segment 300. Thus, the threshold may be defined as the frequency of the least frequent word or phrase of the top three most frequently used words or phrases. According to one or more arrangements, frequency might only be evaluated upon determining that a word or phrase falls into the category of a meaningful word or phrase.

FIG. 5 illustrates an example of a keyword table storing lists of keywords in association with various topic words. Topic words 501 may be listed in one section of table 500, while associated keywords 503 may be provided in another section. Example topic words 501 may include "food," "sports," "football," and "photography." Topic word food 501a may be associated with keywords or key phrases 503a such as "meal," "lunch," "dinner," and "hot dogs." Topic word sports 501b, on the other hand, may be associated with keywords or phrases 503b that include "athletic activity," "competition," "football," "hockey" and the like. Using the keywords and key phrases specified in table 500, search queries may be formed for retrieving text corresponding to a particular topic. In one example, if a speech recognition device wants to retrieve articles associated with sports, the device may generate a search string such as "athletic activity competition articles." Note that in this example, the word articles may be tacked onto the end of the query to limit the types of results returned (e.g., articles rather than photo galleries).

Figure 6:
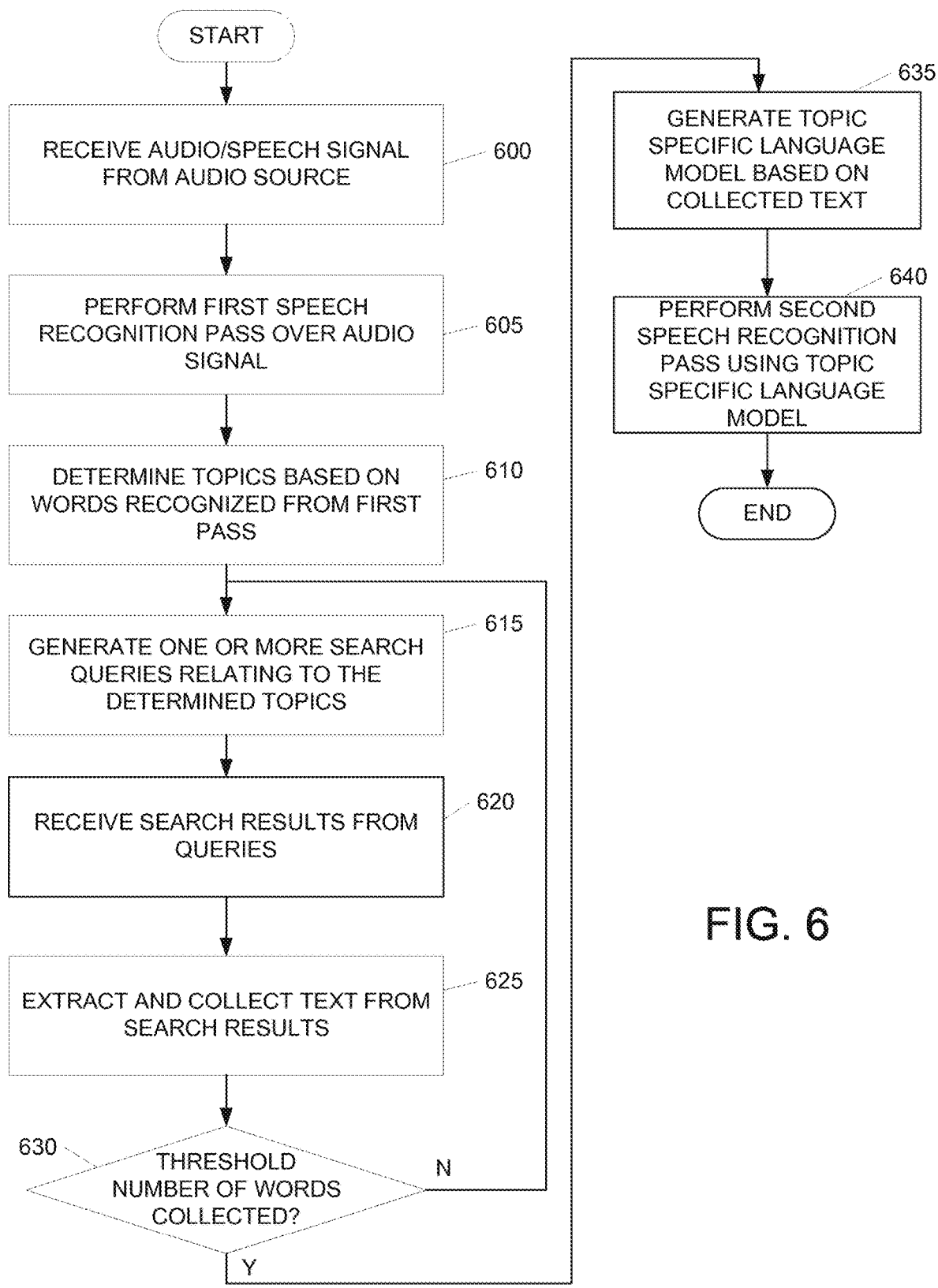
FIG. 6 is a flowchart illustrating an example method for creating a topic specific language model and using the topic specific language model to perform speech recognition on an audio signal according to one or more aspects described herein.

FIG. 6 illustrates an example method for building a topic specific language model and performing speech recognition using the topic specific language model. In step 600, a speech recognition system may receive a speech signal from an audio source. The audio source may include an audio data file, an audio/video file that includes an audio track, a line-in input (e.g., a microphone input device) and the like. In step 605, the speech recognition system subsequently performs a first speech recognition pass over the received audio/speech signal using a generic or basic language model. In some instances, the first speech recognition pass might only return words that have been recognized with a specified level of confidence (e.g., 95%, 99% or the like). The speech recognition system may then determine topics from the returned words recognized from the first pass over the audio signal in step 610.

Using the determined topics, the speech recognition may subsequently generate one or more search queries to identify a corpus of text relevant to the determined topics in step 615. For example, search queries may be created by assembling known keywords associated with or describing the specified topic, as described herein. In response to the search query, the speech recognition system may receive a plurality of search results in step 620. These search results may include multiple types of information including articles, blogs, text from images, metadata, and text from a webpage and may be received from various databases and search engines. Text from each of the search results may then be extracted and collected in step 625. In step 630, the system may determine whether a sufficient number of words has been collected from the search results. The determination may be made by comparing the number of words collected with a specified threshold number of words. The threshold number of words may be, for example, 100,000, 200,000, 1,000,000 or 10,000,000. If the collector module has collected an insufficient number of words, the module may repeat steps 615-625 to obtain more words. For instance, the collector module may generate a new search query or, alternatively or additionally, extract words from additional search results not considered in the first pass.

If, on the other hand, the collector module has obtained a sufficient number of words from the search results, the system may generate a topic specific language model in step 635 using the corpus of text collected. The system may, for example, adapt or revise a basic or generic language model based on the corpus of topic specific text retrieved. By way of example, assuming that a generic or initial language model shows that the probability of the word "dust" immediately following the word "cosmic" at 30% and the probability of the word "dust" immediately following the word "house" at 70%. Assuming that at least one of the topics in the corpus collection and, correspondingly, the speech to be recognized is space, the corpus of topic specific text may show that the probability that the word "dust" appears immediately after the word "cosmic" is 80% versus 20% for "dust" immediately appearing after "house." Accordingly, the speech recognition system may modify the language model to reflect the probabilities determined based on the corpus of topic specific text. Alternatively, the speech recognition system may average the percentages. For example, the average of the two probabilities of "dust" following "cosmic" may result in a 55% probability while the average for "dust" following "house" may average out to 45%. Other algorithms and methods for adjusting a basic language model to produce the topic specific language model may be used. The above example is merely used to illustrate some aspects of the disclosure and is simplified. Language models generally include a greater number of possible word combinations (e.g., many other words may immediately precede the word "dust") and probabilities than discussed in the example above.

Once the topic specific language model has been created, the speech recognition system may perform a second pass over the speech to make a final identification of the words spoken in step 640. The words identified in the second pass may be used for a variety of purposes including automatic transcription of recorded audio, creating a document by speaking the words rather than by typing, data entry and the like.

Figure 7:
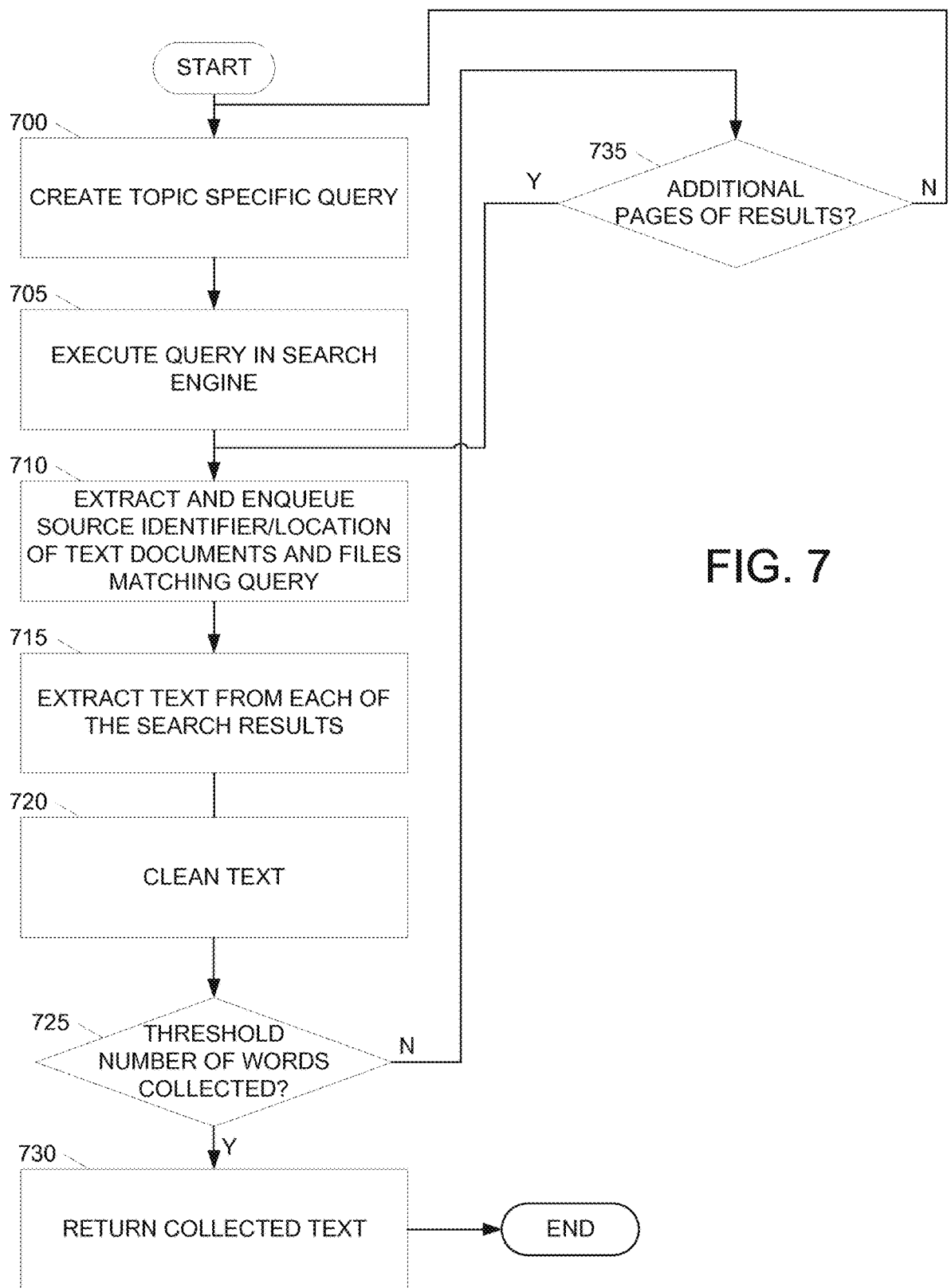
FIG. 7 is a flowchart illustrating an example method for collecting a corpus of text for creating a topic specific language model according to one or more aspects described herein.

FIG. 7 illustrates an example method for collecting a corpus of topic specific text. In step 700, a topic specific query may be created. In step 705, the query may be executed in a search engine to identify one or more groups of text such as articles, websites, press releases and the like. In step 710, the corpus collection module may extract and enqueue a source identifier or location (e.g., a URI or URL) of the text files or documents matching the search query. In step 715, the corpus collection module may extract text from each document or file identified in the search in accordance with the queue and convert the text into raw text. Raw text may include the characters forming the words and phrases with formatting and other extraneous information such as metadata removed. In step 720, the raw text may be cleaned. In particular, words or text that does not form a part of the content of the document or article may be removed. For example, HTML files usually include several text tags or markup elements such as <BODY></BODY> and the like. Because those headers are not part of the content of the web page or HTML site, the headers may be removed so as not to pollute the corpus of text being used to build a topic specific language model. The corpus collection module may use a dictionary of extraneous text to clean the raw text.

In step 725, the corpus collection module may determine whether a threshold number of words has been collected. If so, the corpus collection module may return the current set of words as a final corpus in step 730. If, however, the corpus collection module determines that the threshold number of words has not been collected, the corpus collection module may determine whether additional pages (e.g., a webpage) or groups of search results are available in step 735. If so, the corpus collection module may repeat steps 710-720 to process one or more additional pages or groups of search results. If, however, no additional search results are available, the corpus collection module may return to step 700 to obtain text using another search query in step 740.

The method of FIG. 7 may be repeated or used for each topic, topic word or topic phrase identified by a topic extractor (e.g., topic extractor 215 of FIG. 2). Each topic, topic word or topic phrase may have an associated threshold number of words that is to be collected. The threshold number for each topic, topic word or phrase may be determined by dividing a total number of words needed by the number of topics, topic words and topic phrases. Alternatively, the threshold for each query or topic may be determined based on an estimated significance of the topic so that the corpus of text is topically representative of the speech signal. Significance of a topic may be estimated, for example, by determining a number of words or phrases identified as being associated with the topic in the first speech recognition pass.

In one or more arrangements, a query may include phrases or words for multiple topics of the speech signal to insure that the results received are more likely to be relevant. For example, if a speech signal is related to the Battle of Bull Run, submitting queries using only a single word or phrase from the list of "bull," "run," "civil war," "battle," "Manassas," and "Virginia" might produce search results that are entirely unrelated. For example, an article about anatomy of a bull may be returned. Alternatively or additionally, an article or movie review about Forest Gump might be returned using a query that was solely focused on the word "run." Thus, a query such as "bull run" might be used instead to identify articles, documents and the like that are more likely to be relevant to the actual topic or topics of the speech signal.

The methods and systems described herein may be used in contexts and environments other than audio signals. For example, a topic specific language model may be used to aid in optical character recognition to improve the accuracy of the characters and words identified in a particular image or document.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
   determining, based on a speech recognition process associated with a first language model, a) a first probability value of a second word appearing directly following a first word in a phrase or sentence, and b) a topic associated with an audio signal;
   performing a plurality of searches of a corpus to identify a plurality of terms related to the topic, wherein the corpus comprises a collection of text other than a transcript of the audio signal;
   in response to determining that a quantity of the plurality of terms identified by the searches as related to the topic matches or exceeds a threshold quantity: generating, based on the plurality of terms identified in the corpus, a second language model;
   determining, based on the second language model, a second probability value of the second word appearing directly following the first word; and
   in response to determining that the second probability value is not the same as the first probability value: modifying the first language model to reflect the second probability value.

2. The method of claim 1, further comprising:
   determining an average value based on an average of the first and the second probability value; and
   using the average probability value to determine probability of the second word appearing directly following the first word.

3. The method of claim 1, further comprising, using the modified first language model that reflects the second probability value to determine probability of a sequence of words appearing together.

4. The method of claim 1, further comprising, using the modified first language model in automatically transcribing a recorded audio.

5. The method of claim 1, further comprising, further modifying the first language model based on frequency of occurrence of word combinations in a collected corpus of text.

6. The method of claim 5, further comprising, using the further modified first language model based on the frequency of occurrence of word combinations as a second pass on the speech recognition process to identify words used in a speech.

7. The method of claim 1, wherein the plurality of searches of the corpus comprise searching on the internet.

8. The method of claim 1, wherein the plurality of searches of the corpus comprises searching a publication database.

9. The method of claim 1, wherein the quantity of the plurality of terms is based on at least one of:
   a total quantity of terms needed to generate the second language model and a quantity of topics associated with the audio signal; or
   a respective significance, based on the speech recognition process, for each of a plurality of topics associated with the audio signal.

10. The method of claim 1, further comprising, in response to determining that the quantity of the plurality of terms identified by the searches as related to the topic does not match or exceeds a threshold quantity: continuing to perform searches to identify terms until corresponding search results matches or exceeds the threshold quantity.

11. An apparatus comprising:
    one or more processors; and
    memory storing instructions that, when executed by the one or more processors, cause the apparatus to:
      determine, based on a speech recognition process associated with a first language model, a) a first probability value of a second word appearing directly following a first word in a phrase or sentence, and b) a topic associated with an audio signal;
      perform a plurality of searches of a corpus to identify a plurality of terms related to the topic, wherein the corpus comprises a collection of text other than a transcript of the audio signal;
      in response to determining that a quantity of the plurality of terms identified by the searches as related to the topic matches or exceeds a threshold quantity: generate, based on the plurality of terms identified in the corpus, a second language model;
      determine, based on the second language model, a second probability value of the second word appearing directly following the first word; and
      in response to determining that the second probability value is not the same as the first probability value: modify the first language model to reflect the second probability value.

12. The apparatus of claim 11, wherein the instructions, when executed by the one or more processors, further cause the apparatus to:
    determine an average value based on an average of the first and the second probability value; and
    use the average probability value to determine probability of the second word appearing directly following the first word.

13. The apparatus of claim 11, wherein the instructions, when executed by the one or more processors, further cause the apparatus to use the modified first language model that reflects the second probability value to determine probability of a sequence of words appearing together.

14. The apparatus of claim 11, wherein the instructions, when executed by the one or more processors, further cause the apparatus to use the modified first language model in automatically transcribing a recorded audio.

15. The apparatus of claim 11, wherein the instructions, when executed by the one or more processors, further cause the apparatus to further modify the first language model based on frequency of occurrence of word combinations in a collected corpus of text.

16. The apparatus of claim 15, wherein the instructions, when executed by the one or more processors, further cause the apparatus to use the further modified first language model based on the frequency of occurrence of word combinations as a second pass on the speech recognition process to identify words used in a speech.

17. The apparatus of claim 11, wherein the plurality of searches of the corpus comprise searching on the internet.

18. The apparatus of claim 11, wherein the plurality of searches of the corpus comprises searching a publication database.

19. The apparatus of claim 11, wherein the quantity of the plurality of terms is based on at least one of:

a total quantity of terms needed to generate the second language model and a quantity of topics associated with the audio signal; or a respective significance, based on the speech recognition process, for each of a plurality of topics associated with the audio signal.

20. The apparatus of claim 11, wherein the instructions, when executed by the one or more processors, further cause the apparatus to, in response to determining that the quantity of the plurality of terms identified by the searches as related to the topic does not match or exceeds a threshold quantity: continue performing searches to identify terms until corresponding search results matches or exceeds the threshold quantity.

\* \* \* \* \*